(12) United States Patent
Miller (10) Patent No.: US 7,313,690 B2
(45) Date of Patent: Dec. 25, 2007

(54) THREE WAY VALIDATION AND AUTHENTICATION OF BOOT FILES TRANSMITTED FROM SERVER TO CLIENT

(75) Inventor: Wesley G. Miller, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 836 days.

(21) Appl. No.: 10/609,152

(22) Filed: Jun. 27, 2003

(65) Prior Publication Data

US 2005/0005096 A1    Jan. 6, 2005

(51) Int. Cl.
| | |
|---|---|
| H04L 9/00 | (2006.01) |
| H04K 1/00 | (2006.01) |
| G06F 7/04 | (2006.01) |
| G06F 9/00 | (2006.01) |
| G06F 15/16 | (2006.01) |
| G06F 9/44 | (2006.01) |
| G06F 15/16 | (2006.01) |
| G06F 9/445 | (2006.01) |
| G06F 13/00 | (2006.01) |
| H04L 12/56 | (2006.01) |

(52) U.S. Cl. .................. 713/155; 713/167; 713/176; 713/182; 726/10; 726/11; 709/229

(58) Field of Classification Search ............. 713/155, 713/167, 176, 182; 726/10, 11; 709/229
See application file for complete search history.

(56) References Cited

U.S. PATENT DOCUMENTS

| | | | |
|---|---|---|---|
| 5,758,165 | A | 5/1998 | Shuff |
| 5,892,904 | A | 4/1999 | Atkinson et al. |
| 6,131,192 | A | 10/2000 | Henry |
| 6,185,678 | B1 | 2/2001 | Arbaugh et al. |
| 6,189,100 | B1 * | 2/2001 | Barr et al. .................. 713/182 |
| 6,219,652 | B1 | 4/2001 | Lavange et al. |
| 6,263,431 | B1 | 7/2001 | Nevis et al. |
| 6,298,443 | B1 | 10/2001 | Colligan |
| 6,314,455 | B1 | 11/2001 | Cromer et al. |
| 6,327,652 | B1 | 12/2001 | England et al. |
| 6,327,660 | B1 | 12/2001 | Patel |
| 6,330,670 | B1 | 12/2001 | England et al. |
| 6,341,312 | B1 | 1/2002 | French et al. |

(Continued)

FOREIGN PATENT DOCUMENTS

JP    2002169694 A  *  6/2002

(Continued)

OTHER PUBLICATIONS

Levi et al., "Verification of classical certificates via nested certificate and nested certiifcate paths", 1999 Proceedings, Eighth International Conference on Computer Communications and Networks, Oct. 1999, pp. 242-247.*

Primary Examiner—Matthew Smithers
Assistant Examiner—Courtney D Fields
(74) Attorney, Agent, or Firm—Senniger Powers (57) ABSTRACT

A method and system of transferring boot files from a server to a client having a pre-installation environment. The server authenticates the client. The client authenticates the server. The boot files are transferred from the authenticated server to the authenticated client. The boot files may be authenticated by the client before execution to create an operating system.

12 Claims, 3 Drawing Sheets

U.S. PATENT DOCUMENTS

| | | |
|---|---|---|
| 6,367,012 B1 | 4/2002 | Atkinson et al. |
| 6,385,766 B1 | 5/2002 | Doran |
| 6,438,550 B1 | 8/2002 | Doyle et al. |
| 6,463,535 B1 | 10/2002 | Drews |
| 6,560,706 B1 * | 5/2003 | Carbajal et al. ............ 713/155 |
| 7,093,124 B2 * | 8/2006 | Girard ........................ 713/164 |
| 7,114,018 B1 | 9/2006 | Maity et al. |
| 2003/0135513 A1 | 7/2003 | Quinn et al. |

FOREIGN PATENT DOCUMENTS

| | | |
|---|---|---|
| WO | 99/63434 A1 | 12/1999 |

* cited by examiner

THREE WAY VALIDATION AND AUTHENTICATION OF BOOT FILES TRANSMITTED FROM SERVER TO CLIENT

TECHNICAL FIELD

The present invention relates to the field of validation and authentication of clients, servers and boot files. In particular, this invention relates to the validation and authentication of boot files with regard to clients in a pre-operating system environment connected to servers via a network.

BACKGROUND OF THE INVENTION

A key issue with network booting of pre-operating system (pre-OS) personal computers (PCs) is the difficulty and/or inability to validate the security of such PCs to the server. In addition, many servers are unable to authenticate their clients, and many clients are unable to validate the integrity of their server and/or of the boot files offered to the client by the server. Furthermore, there are significant limitations when booting a new or damaged PC with no installed operating system. There is a need for validating the integrity of the client, server, or boot file, particularly in a pre-OS environment. There is also a need for allowing clients to securely boot regardless of OS state in order to provide a more secure and robust way to boot clients and deploy the OS.

SUMMARY OF THE INVENTION

By placing a pre-installation environment on a client, and by placing components within the pre-installation environment that can validate the integrity of the client, server, or boot file, the invention provides a more secure and robust way to boot clients and deploy the OS. In addition, allowing clients to securely boot regardless of OS state provides a more secure and robust way to boot clients and deploy the OS. Thus, the invention meets the need for a system and method providing an in-resident component of the pre-installation environment that can be used to validate the integrity of any of the three or all three components-client, server, boot file(s).

In general, the invention is a system and method for validating and authenticating operating system boots in a networked environment. Traditional networked based boots do not include validation and authentication components for server/clients. The present invention provides for a three-way authentication framework for server/client authentication and verification. The invention utilizes a validation device, such as digital certificates, on both the client and server components. By exchanging the validation devices, the client can authenticate itself to the server, the server can authenticate itself to the client and the client can verify that boot files transmitted by the server are properly validated.

In accordance with one aspect of the invention, a method transfers via a network boot files from a server to a client having a pre-OS environment. The method comprises installing a client certificate of authenticity in the client; requesting by the client via the network that the server transfer the boot files to the client; sending by the client via the network the installed client certificate of authenticity; authenticating by the server of the client by the received client certificate of authenticity; sending by the server via the network a server certificate of authenticity to the client in response to authenticating by the server of the client; authenticating by the client of the server by the received server certificate of authenticity; requesting by the authenticated client via the network that the authenticated server transfer the boot files to the authenticated client; transferring the boot files from the authenticated server to the authenticated client in response to the requesting by the authenticated client; authenticating by the authenticated client of the transferred boot files; and executing by the authenticated client of the authenticated boot files.

In another form, the invention comprises a method of transferring boot files from a server to a client, comprising authenticating by the server of the client; authenticating by the client of the server; and transferring the boot files from the authenticated server to the authenticated client.

In another form, the invention comprises a method of transferring via a network boot files from a server to a client having a pre-OS environment. The method comprises installing a client certificate of authenticity in the client; requesting by the client via the network that the server transfer the boot files to the client; sending by the client via the network the installed client certificate of authenticity; authenticating by the server of the client by the received client certificate of authenticity; and transferring the boot files from the server to the authenticated client.

In another form, the invention comprises a method of transferring via a network boot files from a server to a client having a pre-OS environment, comprising installing a client certificate of authenticity in the client; requesting by the client via the network that the server transfer the boot files to the client; sending by the client via the network the installed client certificate of authenticity; and receiving by the client of the boot files from the server.

In another form, the invention comprises a method of transferring via a network boot files from a server to a client having a pre-OS environment. The method comprises receiving by the server a request from the client via the network that the server transfer the boot files to the client; receiving by the server via the network a previously installed client certificate of authenticity from the client; authenticating by the server of the client by the received client certificate of authenticity; and transferring the boot files from the server to the authenticated client.

In another form, the invention comprises a method of transferring via a network boot files from a server to a client having a pre-OS environment, comprising requesting by the client via the network that the server transfer the boot files to the client; sending by the server via the network a server certificate of authenticity to the client; authenticating by the client of the server by the received server certificate of authenticity; requesting by the client via the network that the authenticated server transfer the boot files to the client; and transferring the boot files from the authenticated server to the client in response to the requesting by the client.

In another form, the invention comprises a method of transferring via a network boot files from a server to a client having a pre-OS environment, comprising receiving by the server a request from the client via the network that the server transfer the boot files to the client; receiving by the server via the network a previously installed client certificate of authenticity from the client; authenticating by the server of the client by the received client certificate of authenticity; and sending the boot files to the authenticated client by the server via the network.

In another form, the invention comprises a method of transferring via a network boot files from a server to a client having a pre-OS environment, comprising requesting by the client via the network that the server transfer the boot files to the client; receiving by the client via the network a server certificate of authenticity from the server; authenticating by the client of the server by the received server certificate of authenticity; requesting by the client via the network that the authenticated server transfer the boot files to the client; and receiving the boot files from the authenticated server to the client in response to the requesting by the client.

In another form, the invention comprises a method of transferring via a network boot files from a server to a client having a pre-OS environment. The method comprises requesting by the client via the network that the server transfer the boot files to the client; transferring the boot files from the server to the client in response to the requesting by the client; authenticating by the client of the transferred boot files; and executing by the authenticated client of the authenticated boot files.

In another form, the invention comprises a system for transferring boot files comprising a client; a server having boot files; software authenticating the client to the server; software authenticating the server to the client; and software transferring the boot files from the authenticated server to the authenticated client.

In another form, the invention comprises a computer readable medium for transferring via a network boot files from a server to a client having a pre-OS environment. The medium has instructions for requesting by the client via the network that the server transfer the boot files to the client; for sending by the client via the network a previously installed client certificate of authenticity; and for receiving by the client of the boot files from the server.

In another form, the invention comprises a computer readable medium for transferring via a network boot files from a server to a client having a pre-OS environment. The medium has instructions for receiving by the server a request from the client via the network that the server transfer the boot files to the client; for receiving by the server via the network a previously installed client certificate of authenticity from the client; for authenticating by the server of the client by the received client certificate of authenticity; and for transferring the boot files from the server to the authenticated client.

In another form, the invention comprises a computer readable medium for transferring via a network boot files from a server to a client having a pre-OS environment. The medium comprises instructions for receiving by the server a request from the client via the network that the server transfer the boot files to the client; for receiving by the server via the network a previously installed client certificate of authenticity from the client; for authenticating by the server of the client by the received client certificate of authenticity; and for sending the boot files to the authenticated client by the server via the network.

n another form, the invention comprises a computer readable medium for transferring via a network boot files from a server to a client having a pre-OS environment, comprising instructions for requesting by the client via the network that the server transfer the boot files to the client; receiving by the client via the network a server certificate of authenticity from the server; authenticating by the client of the server by the received server certificate of authenticity; requesting by the client via the network that the authenticated server transfer the boot files to the client; and receiving the boot files from the authenticated server to the client in response to the requesting by the client.

Alternatively, the invention may comprise various other methods and apparatuses.

Other features will be in part apparent and in part pointed out hereinafter.

DETAILED DESCRIPTION OF THE INVENTION

The invention comprises a digital certificate or other digital verification or validation device stored on the client to be booted, and another digital certificate or other digital verification or validation device stored on the boot server. The architecture and method according to the invention allow for three-way authentication. A client containing a pre-OS environment with the certificate built in makes a request for boot files from a server (via PXE or other association protocol). The Preboot Execution Environment (PXE) is an industry standard client/server interface that allows networked computers that are not yet loaded with an operating system to be configured and booted remotely by an administrator. The PXE code is typically delivered with a new computer on a read only memory chip or boot disk that allows the computer (a client) to communicate with the network server so that the client machine can be remotely configured and its operating system can be remotely booted. PXE provides three things:

1) The Dynamic Host Configuration Protocol (DHCP), which allows the client to receive an IP address to gain access to the network servers.

2) A set of application program interfaces (API) that are used by the client's Basic Input/Output Operating System (BIOS) or a downloaded Network Bootstrap Program (NBP) that automates the booting of the operating system and other configuration steps.

3) A standard method of initializing the PXE code in the PXE ROM chip or boot disk.

The initial connection between the server and the client is usually initiated by a request from the client, although scenarios are contemplated. At the initial connection between the server and the client, there is no trust established in either direction, i.e., between the server's trust of the client and between the client's trust of the server. After the server receives the request from the client, the client presents its credentials or certificate. The server then determines if the certificate the client presented is valid and not revoked. If it is invalid or revoked the server will not respond. If it is valid, the server responds with a certificate of its own. The client then performs a similar analysis to determine the authenticity and revocation status of the server. If the client verifies that the server is authentic, then the client makes a further request, for the actual boot file(s). The server responds with a digitally signed file. The client will check the file using its own local certificate to determine if the file is authentically signed. If the digital signature is authentic, the client will execute the boot file(s).

Figure 1:
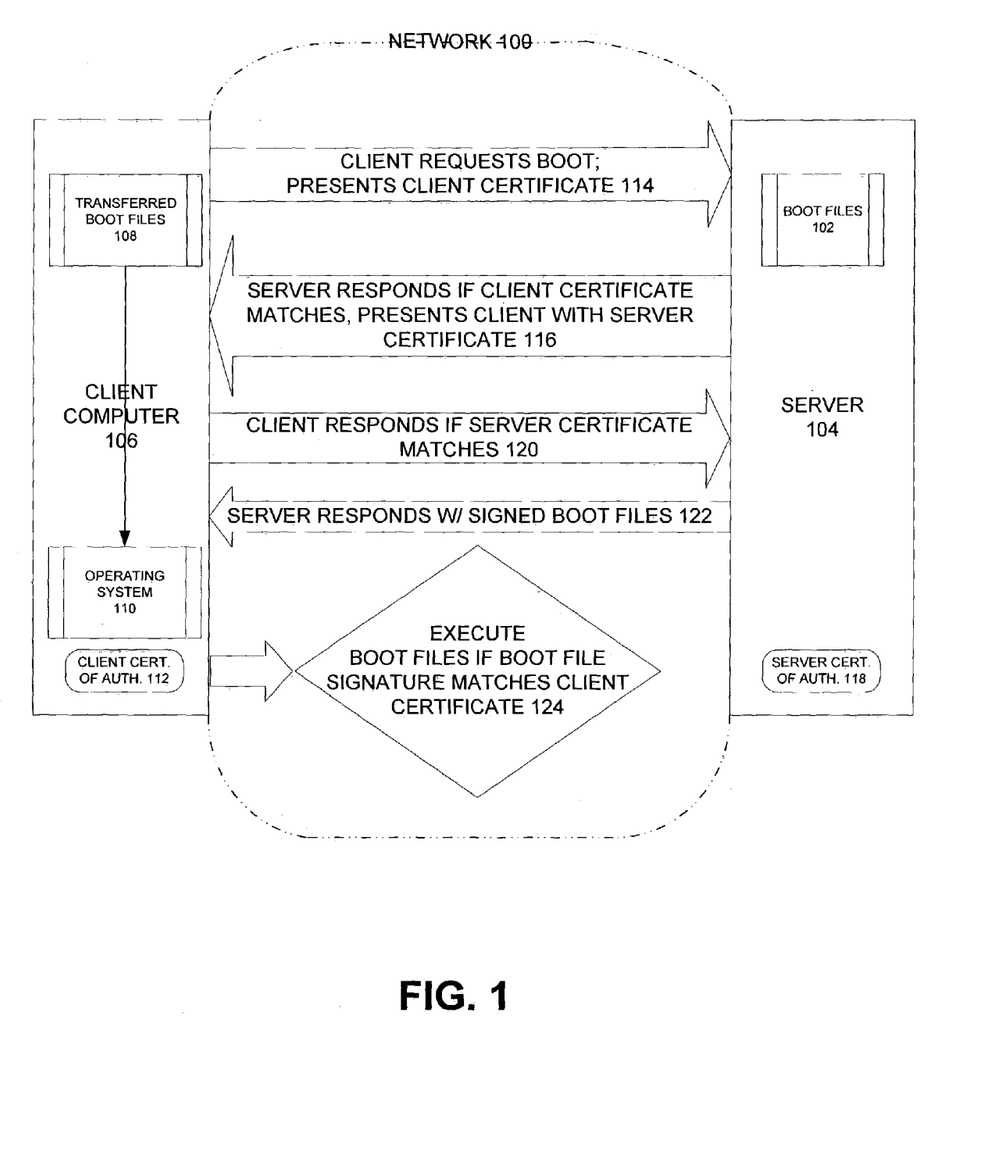
FIG. 1 is a block diagram illustrating communication between a client and a server according to the invention.

FIG. 1 is a block diagram illustrating communication between a client and a server according to the invention. In particular, referring to FIG. 1, a system and method of transferring via a network 100 boot files 102 from a server 104 to a client computer 106 having a pre-OS environment is illustrated. In general, booting is the process of starting or resetting a computer. When first turned on or reset, the computer executes the boot files to load and start its operating system and/or to prepare the computer for use.

Transferred boot files 108 on the client 106 can be executed by the client to create, recreate, modify, expand or enhance an operating system 110 for the client. In general, the authentication according to the invention includes one or more of the following: authenticating by the server 104 of the client 106; and/or authenticating by the client 106 of the server 104; and/or transferring authenticated boot files 102 from the authenticated server 104 to the authenticated client 106 to create transferred boot files on the client 106 which can be authenticated and executed to affect the operating system 110 for the client 106.

Figure 2:
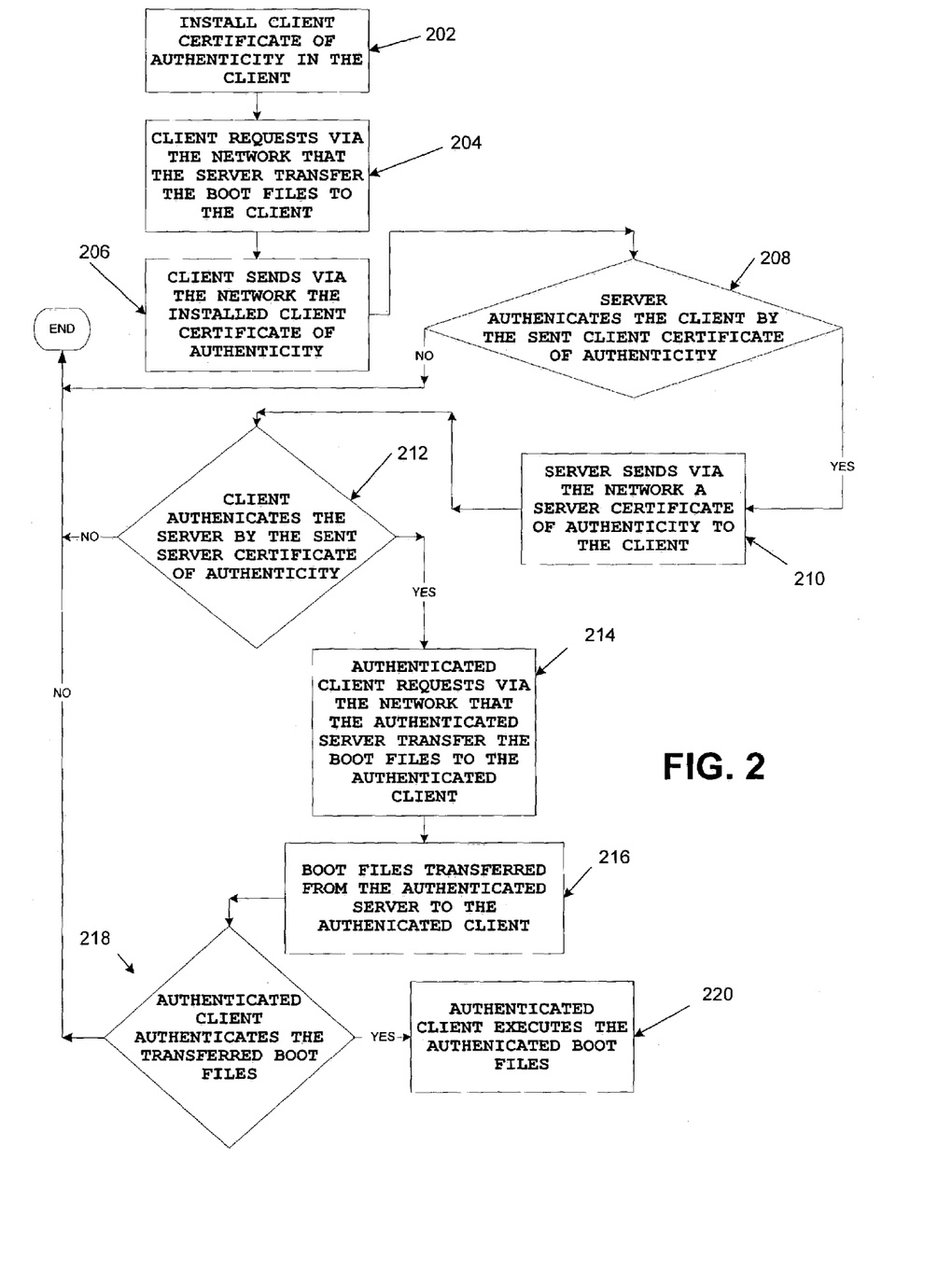
FIG. 2 is a flow chart illustrating the method and operation of the system according to the invention.

FIG. 2 is a flow chart illustrating the method and operation of the system according to the invention. Referring to FIGS. 1 and 2, a method of transferring via the network 100 one or more boot files 102 from the server 104 to the client 106 having a pre-OS environment is illustrated. Initially at 202, a client certificate of authenticity 112 is installed on the client 106. This installation (as well as any other communication between the client and the server) can be accomplished manually or via the network 100. As indicated by arrow 114 in FIG. 1, at 204 the client 106 requests via the network 100 that the server 104 transfer the boot files 102 to the client 106 and at 206 the client presents its credentials by sending via the network the installed client certificate of authenticity 112. At 208, the server 104 authenticates the client by the received client certificate of authenticity 112. If the client is not authentic (e.g., if the client certificate is invalid, expired or revoked), the process ends.

As indicated by arrow 116 in FIG. 1, if the client certificate 112 matches a pre-existing list of authentic clients which the server 104 maintains or has access so that the client 106 is authentic to the server 104, at 210 the server 104 sends via the network 100 a server certificate of authenticity 118 to the client 106 in response to authenticating by the server of the client.

At 212, the client 106 authenticates the server 104 by the received server certificate of authenticity 118. If the server 104 is not authentic (e.g., if the server certificate is invalid, expired or revoked), the process ends. The client 106 may authenticate the server's certificate 118 in one of several ways. For example, the server's certificate 118 may correspond to the client's certificate 112. On the other hand, the server certificate 118 may match a pre-existing list of authentic servers which the client 106 maintains or has access so that the server 104 is authentic to the client 106. As indicated by arrow 120 in FIG. 1, the client 106 responds to the server 104 if the server certificate 118 matches or is verified. In particular, at 214, the authenticated client requests via the network that the authenticated server transfer the boot files 102 to the authenticated client. As indicated by arrow 122 in FIG. 1, the server 104 responds by adding a signature to the boot files 102 and transfers at 216 the signed boot files from the authenticated server to the authenticated client in response to the requesting by the authenticated client.

Next, at 218 the authenticated client authenticates the transferred, signed boot files by confirming that the boot files have a signature corresponding to the client certificate and/or the server certificate. In particular, the transferred boot files should include a signature corresponding to the client certificate of authenticity from the server and the client verifies that the signature corresponds to its certificate of authenticity (see 124 of FIG. 2). If the boot files are not authenticated (e.g., if the boot files are incorrectly signed, invalid, expired or revoked), the process ends. At 220, the authenticated boot files are executed by the client to create the operating system 110.

It is also contemplated that the system and method according to the invention may include only client authorization. This embodiment is implemented as follows. A client certificate of authenticity 112 is installed on the client 106. This can be installed manually or via the network 100 or by the server 104. The client requests via the network that the server transfer the boot files to the client. The client sends via the network the installed client certificate of authenticity. The server authenticates the client by the received client certificate of authenticity and transfers the boot files 102 from the server to the authenticated client. Optionally, the boot files may be signed and the authenticated client may authenticate the transferred, signed boot files before executing the boot files.

From a client perspective, a client authorization system and method would include a client certificate of authenticity installed on the client. The client would have software (or via manual prompting) requesting that the server transfer the boot files to the client. The client via the network sends the installed client certificate of authenticity and receives the boot files from the server. Optionally, the authenticated client may authenticate the transferred boot files before executing them.

From a server perspective, a client authorization system and method would include software on the server for receiving a request from the client via the network that the server transfer the boot files to the client. The software would also receive via the network a client certificate of authenticity previously installed on the client. The server would include software for authenticating the client by the received client certificate of authenticity. Software of the server would then transfer the (optionally signed) boot files from the server to the authenticated client.

It is also contemplated that the system and method according to the invention may include only server authorization. In this embodiment, the client 106 requests via the network 100 that the server 104 transfer the boot files 102 to the client. The server sends via the network a server certificate of authenticity 118 to the client. The client authenticates the server by the received server certificate of authenticity. The client requests via the network that the authenticated server transfer the boot files to the client. In response to the client's request, the boot files are transferred from the authenticated server to the client via the network. Optionally, the boot files may be signed so that they can be authenticated by the client.

From a server perspective, a server authorization system and method would include software for receiving a request from the client via the network that the server transfer the boot files to the client, software receiving via the network a previously installed client certificate of authenticity from the client, software for authenticating the client by the received client certificate of authenticity and software sending the (optionally signed) boot files to the authenticated client via the network.

From a client perspective, a server authorization system and method would include software requesting via the network that the server transfer the boot files to the client, software receiving via the network a server certificate of authenticity from the server, software authenticating the server by the received server certificate of authenticity, software requesting via the network that the authenticated server transfer the boot files to the client and software receiving the (optionally signed) boot files from the authenticated server in response to the client's request.

It is also contemplated that the system and method according to the invention may include only boot file authorization. In this embodiment, the client 106 requests via the network 100 that the server 104 transfer the boot files 102 to the client. The signed boot files are transferred from the server to the client in response to the client's request. The client authenticates the transferred, signed boot files and executes the authenticated boot files.

By having a digital signature or other digital verification device included as a component of the boot files used by the client to create its operating system, there can be thorough validation of the client, server, and boot files. Whether the client software exists on a readable or read/write computer readable memory (CRM) device, the pre-installation environment can:

validate that the server is authentic;
authenticate to the server that the client is authentic; and
validate the integrity of the boot files.

Alternatively, as noted above, differing parts could be implemented only verifying client integrity, only verifying server integrity, or only verifying the integrity of the boot file(s) to allow for differing layers of security. One secure solution according to the invention is to allow for all three, thus verifying all insecure steps of the process.

The following guidelines in case of an authentication failure may also be implemented to reduce risk:

Clients that have an invalid or revoked certificate are not answered by the server.

Servers that have an invalid or revoked certificate are not acknowledged by the client.

Boot files received that are incorrectly signed are not executed by the client. The invention is particularly applicable to network deployment companies and deployment/management companies. The invention focuses on securing of the network boot protocol, a need of corporate customers that has not been met by the prior art.

Figure 3:
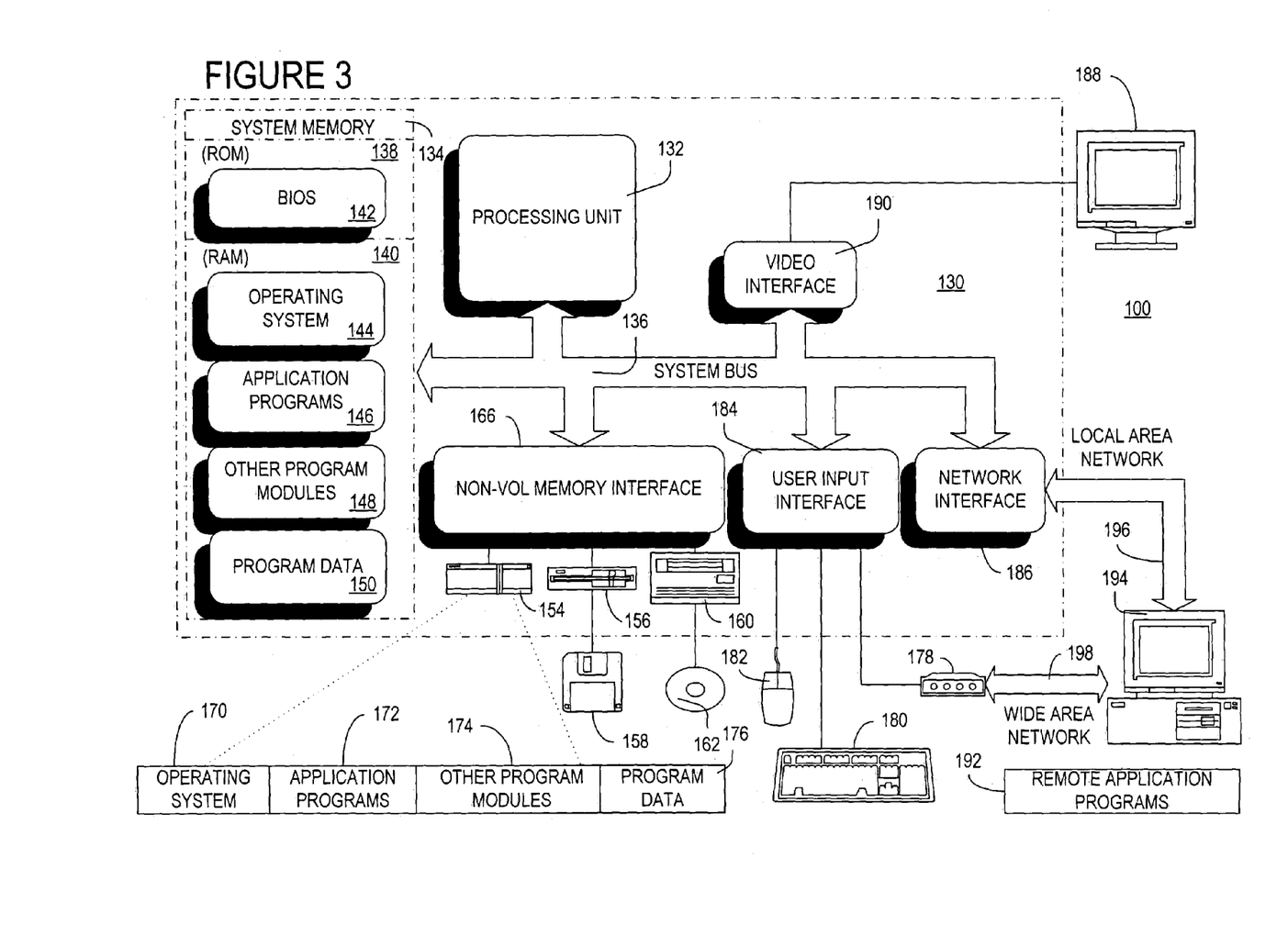
FIG. 3 is a block diagram illustrating one example of a suitable computing system environment in which the invention may be implemented.

FIG. 3 shows one example of a general purpose computing device in the form of a computer 130 which may be a client 106 or server 104. In one embodiment of the invention, a computer such as the computer 130 is suitable for use in the other figures illustrated and described herein as the client and/or server. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 3 illustrates operating system 144, application programs 146, other program modules 148, and program data 150.

The computer 130 may also include other removable/non-removable, volatile/nonvolatile computer storage media. For example, FIG. 3 illustrates a hard disk drive 154 that reads from or writes to non-removable, nonvolatile magnetic media. FIG. 3 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 3, provide storage of computer readable instructions, data structures, program modules and other data for the computer 130. In FIG. 3, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 3 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 3 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as the boot files 102

The following examples further illustrate the invention. If computer 130 is used as a server 104, its memory would include the server certificate of authenticity 118 and software, as noted above, for communicating with the client 106 and for authenticating the client 106. If computer 130 is used as a client 106, its memory would include the client certificate of authenticity 112 and software, as noted above, for communicating with the server 104, for authenticating the server 104, for authenticating the boot files 102 and for executing the boot files 102.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of transferring via a network signed boot files from a server to a PXE client having a pre-OS environment including PXE code, comprising:

installing a PXE client certificate of authenticity in the PXE client;

requesting, by the PXE client using the PXE code via the network that the server, transfer the signed boot files for execution by the PXE client to at least one of create, recreate, modify, expand and enhance an operating system for the PXE client, said requesting occurring after the installation of the client certificate of authenticity in the PXE client;

sending by the PXE client via the network the installed PXE client certificate of authenticity wherein, in response to the receipt of the PXE client certificate of authenticity, the server authenticates the received PXE client certificate of authenticity and wherein, in response to authenticating by the server of the PXE client, the server sends via the network a server certificate of authenticity to the PXE client;

authenticating, by the PXE client, the server by the received server certificate of authenticity;

requesting, by the authenticated PXE client using the PXE code via the network, the transfer the signed boot files from authenticated server to the authenticated PXE client wherein, in response to receiving the request by the authenticated PXE client, the authenticated server transfers the signed boot files to the authenticated PXE client, said signed boot files including a signature corresponding to the PXE client certificate of authenticity or the server certificate of authenticity;

authenticating, by the authenticated PXE client, the transferred signed boot files by the signature of the transferred signed boot files; and executing by the authenticated PXE client of the authenticated signed boot files thereby creating, recreating, modifying, expanding or enhancing an operating system for the PXE client.

2. The method of claim 1 wherein PXE clients that have an invalid or revoked certificate are not authenticated or answered by the server.

3. The method of claim 1 wherein servers that have an invalid or revoked certificate are not acknowledged by the PXE client.

4. A method of transferring signed boot files from a server to a PXE client having a pre-OS environment including PXE code, comprising:

receiving, by the server of the PXE client, a request from the PXE client for the transfer of the signed boot files for execution by the PXE client of at least one of create, recreate, modify, expand and enhance an operating system of the PXE client, said request being sent by the client using the PXE code;

receiving, by the server, a PXE client certificate of authenticity, said PXE client certificate of authenticity being installed on the PXE client;

authenticating, by the server, the PXE client by the received PXE client certificate of authenticity;

sending, by the server, a server certificate of authenticity to the authenticated PXE client, wherein in response to receiving said server certificate of authenticity, the authorized PXE client authenticates the server by the received server certificate of authenticity, and wherein in response to authenticating the server, the authorized PXE client requests the transfer the signed boot files from authenticated server; and transferring, by the server, the signed boot files including a signature to the authenticated PXE client, said signature corresponding to the PXE client certificate of authenticity or the server certificate of authenticity, wherein in response to receiving transferred signed boot files, the authenticated PXE client authenticates the transferred signed boot files by the signature of the transferred signed boot files, and wherein in response to authenticating transferred signed boot files, the PXE client executes the authenticated boot files thereby creating, recreating, modifying, expanding or enhancing an operating system of the PXE client.

5. The method of claim 4 wherein PXE clients that have an invalid or revoked certificate are not authenticated or answered by the server.

6. The method of claim 4 wherein servers that have an invalid or revoked certificate are not acknowledged by the PXE client.

7. The method of claim 4 wherein signed boot files received by the PXE client that are incorrectly signed are not executed by the PXE client.

8. A system for transferring signed boot files, comprising:

a PXE client including PXE code and an installed PXE client certificate of authenticity, said PXE client including computer executable instructions for:

requesting from a server, by the PXE client using the PXE code, the transfer of signed boot files for execution by the PXE client to at least one of create, recreate, modify, expand and enhance an operating system for the PXE client;

sending, by the PXE client, the installed PXE client certificate of authenticity to the server;

authenticating, by the PXE client, the server by a server certificate of authenticity received from the server;

requesting, by the authenticated PXE client using the PXE code, the transfer the signed boot files from authenticated server;

authenticating, by the authenticated PXE client, the transferred signed boot files by a signature of the transferred signed boot files received from the server, said signature corresponding to the PXE client certificate of authenticity or the server certificate of authenticity; and executing, by the authenticated PXE client, the authenticated signed boot files thereby creating, recreating, modifying, expanding or enhancing an operating system for the PXE client; and a server having signed boot files and including computer executable instructions for:

receiving, by the server, the request from the PXE client for transfer the signed boot files;

receiving a PXE client certificate of authenticity, said PXE client certificate of authenticity being installed on the PXE client;

authenticating the PXE client to the server by the received PXE client certificate of authenticity;

sending a server certificate of authenticity to the authenticated PXE client; and transferring the signed boot files including a signature from the authenticated server to the authenticated PXE client, said signature corresponding to the PXE client certificate of authenticity or the server certificate of authenticity.

9. The method of claim 8, wherein the authenticated PXE client includes an operating system generated from the executed authenticated signed boot files.

10. A computer readable medium storage for transferring signed boot files via a network from a server to a PXE client having a pre-OS environment including PXE code, comprising instructions for:

requesting the server transfer the signed boot files using the PXE code via the network for execution by the PXE client to at least one of create, recreate, modify, expand and enhance an operating system for the PXE client;

sending a previously installed PXE client certificate of authenticity to the server using the PXE code via the network, wherein, in response to the receipt of the PXE client certificate of authenticity, the server authenticates the received PXE client certificate of authenticity and wherein, in response to authenticating of the PXE client by the server, the server sends via the network a server certificate of authenticity to the PXE client;

authenticating, by the PXE client, the server by the received server certificate of authenticity;

requesting, by the authenticated PXE client using the PXE code via the network, the transfer the signed boot files from authenticated server to the authenticated PXE client wherein, in response to receiving the request by the authenticated PXE client, the authenticated server transfers the signed boot files to the authenticated PXE client, said signed boot files including a signature, said signature corresponding to the PXE client certificate of authenticity or the server certificate of authenticity;

receiving the signed boot files from the server;

authenticating the transferred signed boot files by the signature of the transferred signed boot files; and executing the authenticated boot files thereby creating, recreating, modifying, expanding or enhancing an operating system of the PXE client.

11. A computer readable storage medium for transferring via a network signed boot files from a server to a PXE client having a pre-OS environment including PXE code, comprising instructions for:

receiving a request from the PXE client using the PXE code via the network for the transfer the signed boot files for execution by the PXE client to at least one of create, recreate, modify, expand and enhance an operating system for the PXE client;

receiving via the network a previously installed PXE client certificate of authenticity from the PXE client;

authenticating the PXE client by the received PXE client certificate of authenticity;

sending a server certificate of authenticity to the authenticated PXE client, wherein in response to receiving said server certificate of authenticity, the authorized PXE client authenticates the server by the received server certificate of authenticity, and wherein in response to authenticating the server, the authorized PXE client requests the transfer the signed boot files from authenticated server wherein the signature of the signed boot files corresponds to the PXE client certificate of authenticity or the server certificate of authenticity; and transferring the signed boot files to the authenticated PXE client wherein in response to receiving transferred signed boot files, the authenticated PXE client authenticates the transferred signed boot files by the signature of the transferred signed boot files, and wherein in response to authenticating transferred signed boot files, the authenticated PXE client executes the authenticated boot files thereby creating, recreating, modifying, expanding or enhancing an operating system of the PXE client.

12. The method of claim 1, wherein the PXE code of the PXE client comprises: The Dynamic Host Configuration Protocol (DHCP) for allowing the PXE client to receive an IP address to gain access to the server via the network; a set of application program interfaces (API) for automating the booting of the operating system and other configuration steps on the PXE client; and a standard method of initializing the PXE code in the PXE ROM chip or boot disk of the PXE client.

* * * * *